(12) United States Patent
Tuvim

(10) Patent No.: US 6,811,061 B2
(45) Date of Patent: Nov. 2, 2004

(54) DEVICE FOR STORING, MEASURING AND DISPENSING GRANULAR AND POWDER MATERIALS

(76) Inventor: Yuri Tuvim, 11 Norwood Heights, Glochester, MA (US) 01930

( * ) Notice: Subject to any disclaimer, the term of this patent is extended or adjusted under 35 U.S.C. 154(b) by 0 days.

(21) Appl. No.: 10/379,878

(22) Filed: Mar. 6, 2003

(65) Prior Publication Data

US 2004/0173643 A1 Sep. 9, 2004

(51) Int. Cl.[7] .............................................. G01F 11/28
(52) U.S. Cl. ........................ 222/361; 222/336; 222/450
(58) Field of Search ................................ 222/336, 344, 222/354–356, 361–363, 366, 425, 448–451, 444, 453

(56) References Cited

U.S. PATENT DOCUMENTS 3,185,190 A * 5/1965 Grawford .................... 141/360
6,450,371 B1 * 9/2002 Sherman et al. ............. 222/361
2003/0164386 A1 * 9/2003 Connelly et al. ........... 222/361

* cited by examiner

*Primary Examiner*—J. Casimer Jacyna
(74) *Attorney, Agent, or Firm*—I. Zborovsky

(57) ABSTRACT

A device for storing, measuring and dispensing granular and powder material has a container for accommodating a material, a dispensing unit with a casing having a filling opening and a dispensing opening and a slight movable in the casing between the filling position in which a slight compartment can side with the filling opening for pouring the material from the container into the slide, a spring, and a spring moving the slide from the filling position to a dispensing position in which the dispensing opening coincides with the filling opening of the casing and a spring arranged so that the slide can be moved from the filling position to the dispensing position by a user with overcoming a spring force, while the spring moves the slide from dispersing position to the stirring position.

10 Claims, 4 Drawing Sheets

DEVICE FOR STORING, MEASURING AND DISPENSING GRANULAR AND POWDER MATERIALS

BACKGROUND OF THE INVENTION

The present invention relates to a household device for storing, measuring and dispensing of granular and powder materials, such as for example coffee, baby formula, dried milk, non-dairy creamer, sugar, flour, detergents and the like. Some of such devices are disclosed for example in U.S. Pat. Nos. 1,455,970; 1,471,621; 1,904,756; 3,072,299; 3,185,190; 3,193,159; 5,421,491.

The device disclosed in the above-mentioned patents can be further improved.

SUMMARY OF THE INVENTION

Accordingly, it is an object of the present invention to provide device for storing, measuring and dispensing granular and powder materials which is a further improvement of existing devices.

More particularly, it is an object of the present invention to provide for device which is compact, convenient to handle, and provides storage, measurement and dispensing of powder and granular material.

In keeping with these objects and with others which will become apparent hereinafter, one feature of the present invention resides, briefly stated, in a device for storing, measuring and dispensing granular and powder materials, comprising a container for accommodating a material; and a dispensing unit connected to said container, said dispensing unit including a casing provided with a filling opening communicating with an interior of said container and a dispensing opening which is spaced from said filling opening and formed to dispense a material, a slide movable in a passage of said casing and having a side compartment formed so that when the slide is moved in said passage to a filling position said slide compartment coincides with said filling opening and when said slide is moved to a dispensing position said slide compartment coincides with said dispensing opening so that the material can be poured from said container through said filling opening into said compartment in said filling position, and then dispensed through said dispensing opening outwardly in said dispensing position, and spring means provided between said casing and said slide so that said slide is moved from said filling position to said dispensing position with overcoming a spring force and then is moved from said dispensing position to a storing position under the action of a spring force of said spring means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
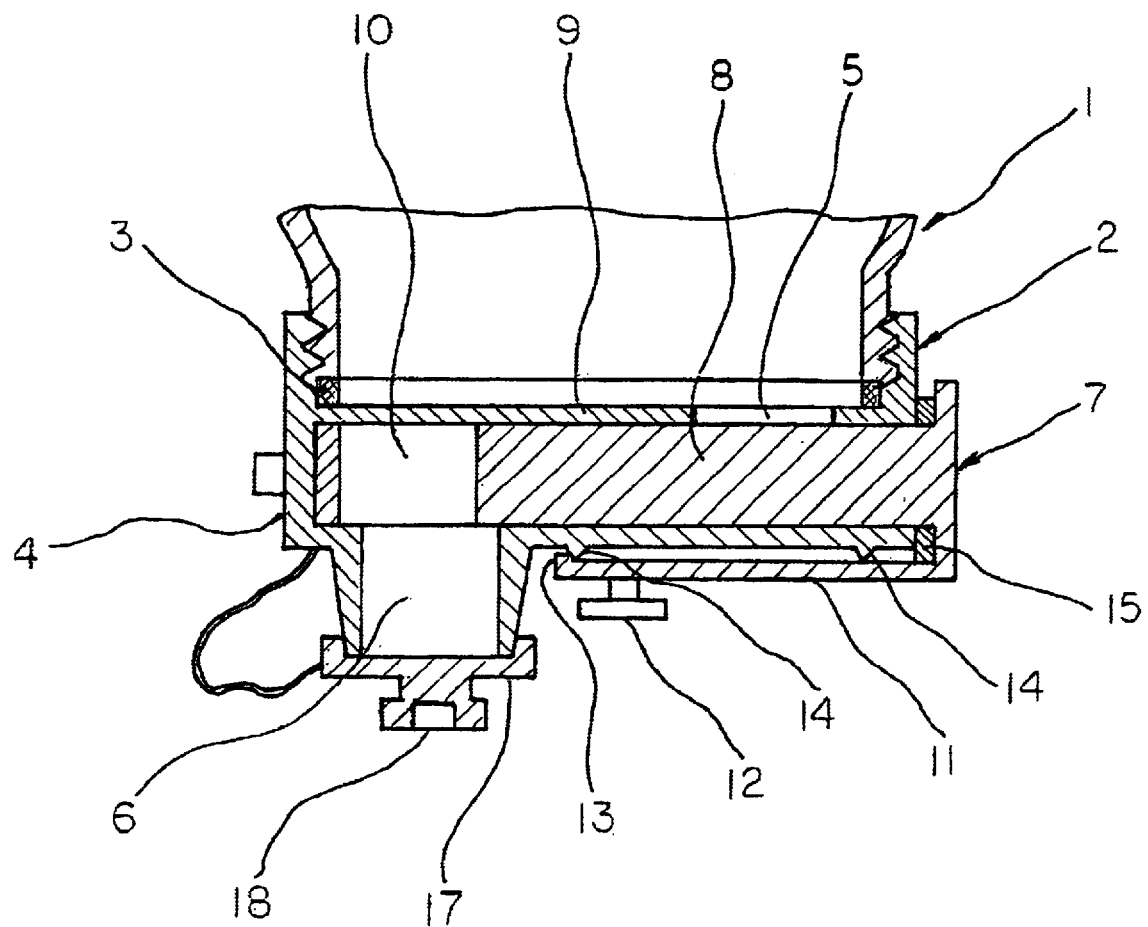
FIG. 1 is a view showing a section of the device in accordance with the present invention in a closed position for storing.

A device for storing, measuring and dispensing granular and powder materials has a housing which is identified as a whole with reference numeral 1 and a dispensing unit which is identified with reference numeral 2. The housing 1 and the dispensing unit 2 can be connected with one another by known means for example by threaded means and non-threaded means, preferably with interposition of sealing means 3.

The dispensing unit 2 has a casing 4 with an upper part connectable with the container 1, an upper wall provided with a filling opening 5 and a lower wall provided with a discharging opening 6. The dispensing unit 2 further has a slide 7 which has a body 8 slidable in a passage 9 provided in the casing 4 between the upper and lower substantially parallel walls. The body 8 of the slide has a slide compartment which is identified with reference numeral 10.

The slide further has an end wall and a flexible latch 11 extending from the end wall and provided with a handle 12. A gap is retained between the latch 11 of the slide 7 and the lower surface of the casing 4. The latch 11 is provided with an end projection 13, while the lower surface of the casing 4 is provided with two projections 14 spaced from one another in a transverse direction. A seal or gasket 15 is arranged on the body of the slide adjacent to the end wall, between the end wall of the slide 7 and the casing 4.

Figure 2:
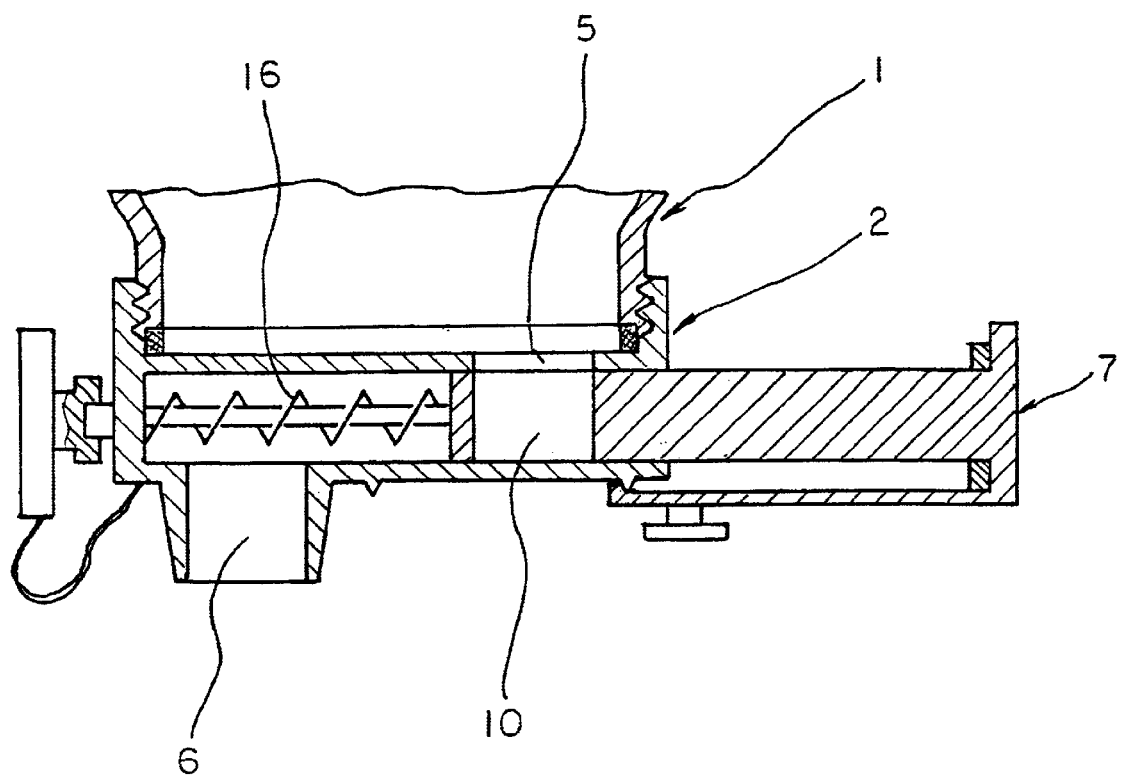
FIG. 2 is a view showing a section of the inventive device in a filling position.

As can be seen from FIG. 2, spring means 16 including for example two springs are arranged in the passage of the casing 4 between a left end wall of the casing and a left wall of the slide. The dispensing opening 6 of the casing 4 is closeable by a cap 17 provided with a handle 18 and connected to the casing by a flexible element 19 for preventing loss of the cap.

The inventive device operates in the following manner. In the position shown in FIG. 1, the slide 7 is located in its extreme left position (storing position) so that the body 8 of the slide closes the filling opening 5 of the casing 4, while the dispensing opening 6 of the casing 4 is closed by the cap 17. A material to be dispensed is stored in the container 1 and can not be dispensed from it.

In order to dispense a portion of a material, the cap 17 is removed and placed with its handle 8 on a projection of the casing 4, and the slide is displaced first to a filling position shown in FIG. 2. In this position the compartment 10 of the slide is in alignment with the filling opening 5 of the container 1 and a portion of the material is poured from the container 1 into the compartment 10 of the slide. The slide is then pushed to the dispensing position shown in FIG. 3 so that the compartment 10 of the slide coincides with the dispensing opening 6 and the portion of the material is poured from the compartment 10 of the slide through the dispensing opening 6 into a desired exterior container and the like.

Figure 3:
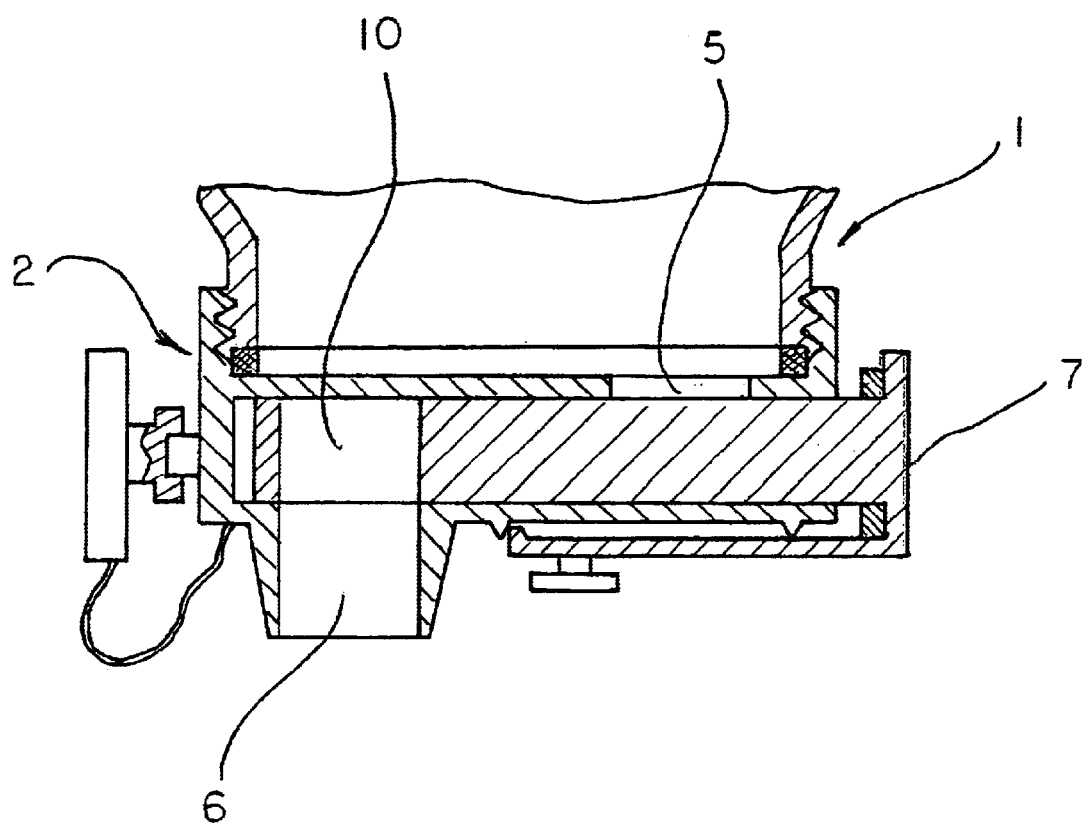
FIG. 3 is a view showing a section of the inventive device in a discharging position.
Figure 4:
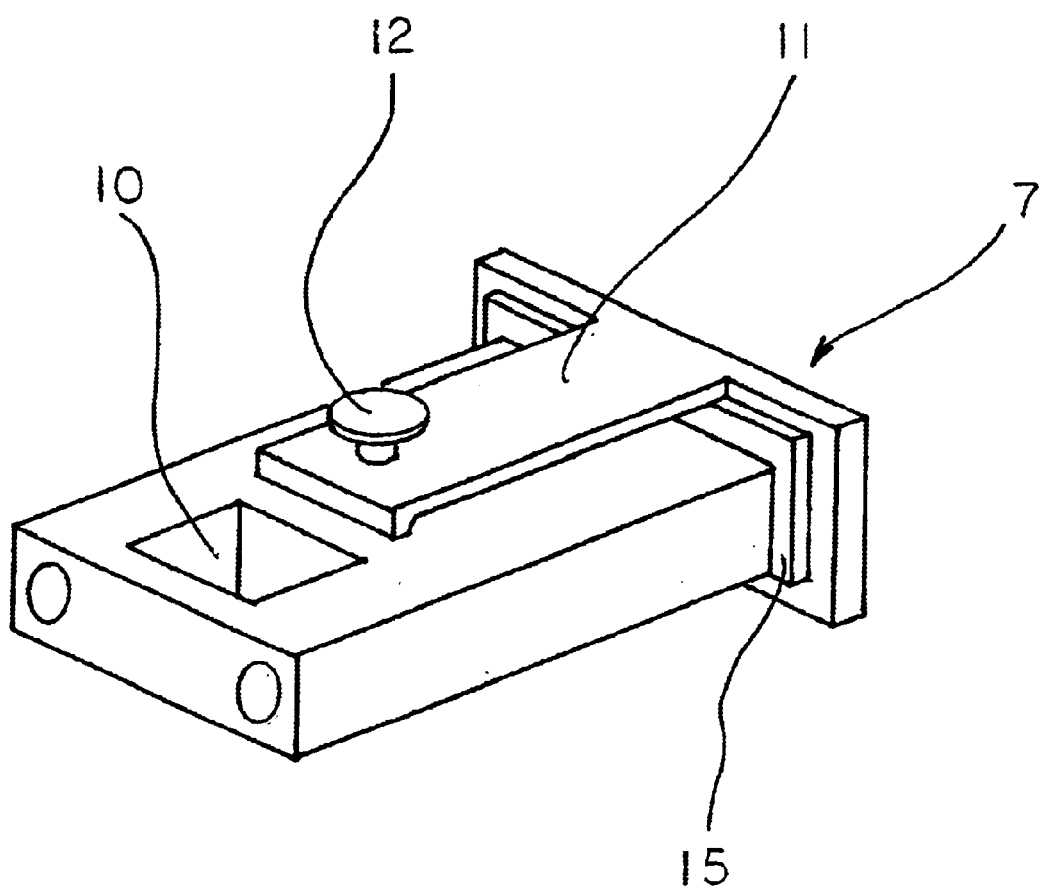
FIG. 4 is a perspective view of the inventive device.

The displacement of the slide 7 from its position shown in FIG. 2 to its position shown in FIG. 3 is performed by a user by pushing the end wall of the slide 7 and overcoming the resistance of the spring means 16. After dispensing of the portion of the material through the dispensing opening 5, the spring means press the slide 7 back to the position shown in FIG 1. Also, in order to move the slide from the position shown in FIG. 1 to the position shown in FIG. 2, a user uses the handle 12 of the latch 11 and the projection 13 of the latch 1 jumps over the projection 14 of the casing to slide in a space between the two projections 14. When the slide 7 is returned to its position shown in FIG. 1, the projection 13 is retained at the left side of the left projection 14 of the casing.

The sliding movements between the filling and dispensing openings are working movements (FIG. 2–FIG. 3).

FIG. 1 shows the storing position. In this position the projection 13 was pushed to the left over the right projection 14 by applying pressure by a user to the end wall 7. The soft gasket 20 is compressed thus providing air-tight seal of the right side of the passage 9 of the casing 4. The cover 7 provides air-tight seal for the opening 6.

Thus, in the storing position shown in FIG. 1 the whole device is air-tight and thereby assures freshness of the product which is stored in the device.

It should be mentioned that the left projection 14 is provided for engaging by and disengaging from the projection 13 of the elastic latch 11 to allow corresponding movements of the slide 7 and holding of the slide 7 in the storing position, while the right projection 14 is provided for preventing a complete withdrawal of the slide 7 from the casing 4.

It will be understood that each of the elements described above, or two or more together, may also find a useful application in other types of constructions differing from the types described above.

While the invention has been illustrated and described as embodied in device for storing, measuring and dispensing granular and powder materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspecgts of this invention.

What is claimed as new and desired to be protected by Letters Patent is set forth in the appended claims.

What is claimed is:

1. A device for storing, measuring and dispensing granular and powder materials, comprising a container for accommodating a material; and a dispensing unit connected to said container, said dispensing unit including a casing provided with a filling opening communicating with an interior of said container and a dispensing opening which is spaced from said filling opening and formed to dispense a material, a slide movable in a passage of said casing and having a slide compartment formed so that when said slide is moved in said passage to a filling position said slide compartment coincides with said filling opening and when said slide is moved to a dispensing position said slide compartment coincides with said dispensing opening so that the material can be poured from said container through said filling opening into said slide compartment in said filling position and dispensed from said slide compartment in said dispensing position; and spring means provided between said casing and said slide so that said slide is moved from said filling position to said dispensing position with overcoming a spring force and is moved from said dispensing position to a storing position under the action of a spring force of said spring means, said slide having an elastic latch engageable with said casing so as to hold said slide in said storing position, and disengageable from said casing so as to move said slide from said storing position to said filling position, from said filling position to said dispensing position, said dispensing position back to said storing position, said housing having a first engaging formation, said latch having a second engaging formation cooperating with said first engaging formation so as to hold said slide in said storing position or to release said second engaging formation to allow movement of said slide between said positions, said housing also having an additional engaging formation which is engageable with said first engaging formation of said slide and prevents said slide from a complete removal from said casing.

2. A device as defined in claim 1; and further comprising sealing means provided between said slide and said casing.

3. A device as defined in claim 1; and further comprising a closing member for releaseably closing said dispensing opening of said casing.

4. A device as defined in claim 3, wherein said closing member is provided with a handle for moving said closing member between a position in which it closes said dispensing opening and a position in which it opens said dispensing opening.

5. A device as defined in claim 4, wherein said closing member is provided with an elastic element which connects said closing member to said casing.

6. A device as defined in claim 1; and further comprising sealing means provided between said container and said casing.

7. A device as defined in claim 1, wherein said casing has two substantially parallel walls, one of said walls being provided with said filling opening while the other of said walls being provided with said dispensing opening, said passage in which said slide moves being formed between said openings.

8. A device as defined in claim 3, wherein said closing member is placeable with said handle on a projection of said casing.

9. A device as defined in claim 1; and further comprising a sealing member located between said slide and said casing and sealing said slide with respect to said casing in said storing position.

10. A device for storing, measuring and dispensing granular and powder materials, comprising a container for accommodating a material; and a dispensing unit connected to said container, said dispensing unit including a casing provided with a filling opening communicating with an interior of said container and a dispensing opening which is spaced from said filling opening and formed to dispense a material, a slide movable in a passage of said casing and having a slide compartment formed so that when said slide is moved in said passage to a filling position said slide compartment coincides with said filling opening and when said slide is moved to a dispensing position said slide compartment coincides with said dispensing opening so that the material can be poured from said container through said filling opening into said slide compartment in said filling position and dispensed from said slide compartment in said dispensing position; and spring means provided between said casing and said slide so that said slide is moved from said filling position to said dispensing position with overcoming a spring force and is moved from said dispensing position to a storing position under the action of a spring force of said spring means, said slide having an elastic latch engageable with said casing so as to hold said slide in said storing position, and disengageable from said casing so as to move said slide from said storing position to said filling position, from said filling position to said dispensing position, from and said dispensing position back to said storing position, said elastic latch being provide with a handle for displacing said slide between said positions.

* * * * *